United States Patent [19]

Wagensonner

[11] 4,087,830
[45] May 2, 1978

[54] ARRANGEMENT FOR INDICATING THAT A SELECTED EXPOSURE VALUE IS TOO HIGH, TOO LOW OR PROPER

[75] Inventor: Eduard Wagensonner, Aschheim, Germany

[73] Assignee: AGFA-Gevaert, A.G., Leverkusen, Germany

[21] Appl. No.: 795,426

[22] Filed: May 10, 1977

[30] Foreign Application Priority Data

May 14, 1976 Germany .............................. 2621613

[51] Int. Cl.$^2$ .......................... G08B 21/00; G01J 1/44
[52] U.S. Cl. .................................... 354/60 L; 356/226
[58] Field of Search ..................... 354/21, 42, 53, 59, 354/60 E, 60 L; 356/225, 226, 227

[56] References Cited

U.S. PATENT DOCUMENTS

| | | | |
|---|---|---|---|
| 3,657,987 | 4/1972 | Babcock | 354/60 L X |
| 3,849,769 | 11/1974 | Chiba | 354/60 L X |

Primary Examiner—L. T. Hix
Assistant Examiner—M. L. Gellner
Attorney, Agent, or Firm—Michael J. Striker

[57] ABSTRACT

A first voltage divider comprised of a fixed resistor and a light-dependent resistor, and a second voltage divider comprised of two fixed resistors are both connected across the camera battery. A variable attenuator is located in the path of scene light incident upon the light-dependent resistor and is coupled to the diaphragm-setting selector for coordinated movement. Two transistors of complementary conductivity type have their bases connected in common to the first voltage-divider tap and their emitters connected in common to the second voltage-divider tap. Each one of two light-emitting diodes is connected in the collector-emitter circuit of a respective one of the two transistors. An adjustable resistor is connected between the bases and emitters of the transistors for establishing the potential difference across the two voltage-divider taps at which the transistors become conductive and the diodes become illuminated.

4 Claims, 3 Drawing Figures

ARRANGEMENT FOR INDICATING THAT A SELECTED EXPOSURE VALUE IS TOO HIGH, TOO LOW OR PROPER

BACKGROUND OF THE INVENTION

The invention relates to photographic cameras provided with means for selecting an exposure value, such as diaphragm setting. More particularly, the invention relates to an indicating arrangement for indicating whether the selected exposure value is too high, too low or proper for the prevailing scene light.

Indicating arrangements of this type are known, but in general are too expense and complex, particularly for use in cameras of simple and inexpensive construction.

SUMMARY OF THE INVENTION

It is accordingly a general object of the invention to provide an indicating arrangement of the type in question which is of very simple circuit configuration and which is very simple and reliable in operation.

A more particular object is to provide an indicator arrangement which indicates, in the first place, whether the discrepancy between the selected exposure value and the exposure value ideal for the prevailing light is within or outside an acceptable range of discrepancies, and for indicating, in the second place, whether the selected exposure value is too high or too low.

For example, the selectable exposure value may be the diaphragm setting, and only a limited number of diaphragm settings may be selectable. If the discrepancy between the selected diaphragm setting and the setting ideal for the prevailing light is such that changeover to the next setting would produce an even greater discrepancy, the indicating arrangement should not indicate that the selected diaphragm setting is too high or too low, but should instead indicate that the selected setting is proper.

These objects can be achieved, according to one concept of the invention, by utilizing a first light-dependent voltage divider and a second light-independent or reference voltage divider. Means are provided for varying the light incident upon the photosensitive element of the first voltage divider in dependence upon the setting of an exposure-value selector. Two transistors of complementary conductivity types have their bases connected to each other and to the first voltage-divider tap, their emitters connected to each other and to the second voltage-divider tap. The collectors of the transistors are connected to respective ones of the camera battery terminals. The two voltage dividers are both connected across the camera battery. First and second light-emitting diodes are each connected in the collector-emitter circuit of a respective one of the transistors. An adjustable resistor is connected between the bases and the emitters of the transistors and is operative for establishing the difference in potential between the two voltage-divider taps at which one or the other of the transistors becomes conductive.

The light-emitting diodes can each be connected between the collector of the respective transistor and the respective battery terminal, or alternatively can be connected between the emitter of the respective transistor and the second voltage-divider tap, but in either case with such a polarity as to conduct current in the same direction as the collector-emitter circuit of the respective transistor.

With this circuit configuration, a considerable advantage is achieved. Depending upon the resistance of the adjustable resistor, and depending upon the magnitude and sense of the error in the selected exposure value, one or the other of the two light-emitting diodes will light up, when the error exceeds a certain value. If the adjustable resistor is set to a larger resistance value, then one or the other light-emitting diode will light up in response to even a small discrepancy between the selected and ideal exposure values. If the adjustable resistor is set to a smaller resistance value, then one or the other of the light-emitting diodes will light up, but not unless there is a considerable discrepancy between the selected and ideal exposure values. Advantageously, use can be made of the threshold voltages of not only the transistors but also of the two light-emitting diodes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
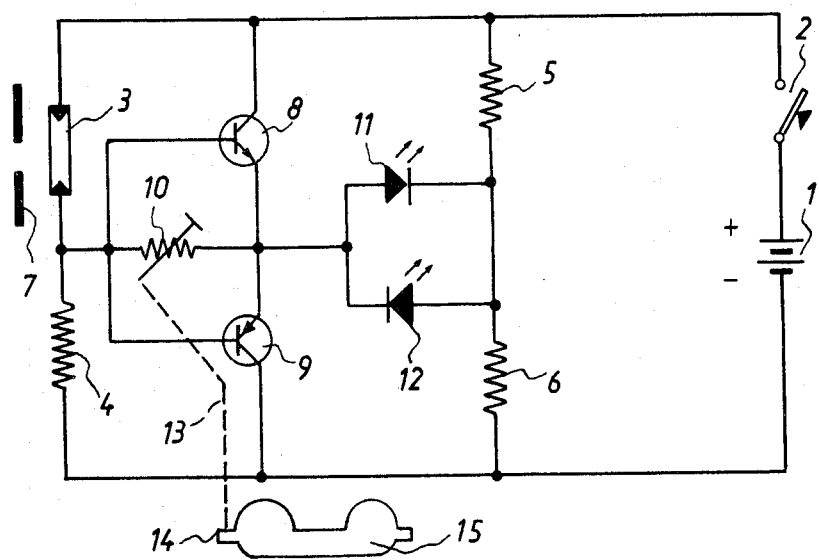
FIG. 1 depicts a first embodiment of the invention.

In the circuit of FIG. 1, numeral 1 denotes the camera battery, connectable to the rest of the circuit by means of a switch 2. A light-dependent first voltage divider is comprised of a photoresistor 3 and a fixed resistor 4. A second or reference voltage divider is comprised of a fixed resistor 5 and another fixed resistor 6. Located in the path of scene light incident upon photoresistor 3 is a variable light attenuator 7. The voltage-divider tap between photoresistor 3 and resistor 4 is connected via a line to the base of a first transistor 8 and by another line to the base of a second transistor 9; transistors 8 and 9 are of opposite conductivity types. The emitters of the two complementary transistors 8, 9 are connected to each other. An adjustable resistor 10 is connected between the bases and emitters of the two transistors 8, 9.

The two emitters are connected to the tap of second voltage divider 5, 6 through the intermediary of two light-emitting diodes 11, 12, connected antiparallel to each other. When the light-dependent first voltage divider 3, 4 is properly set (i.e., when the selected exposure value is correct), the potentials at the two voltage-divider taps will, in principle, be equal. Accordingly, neither one of the two light-emitting diodes 11, 12 will light up.

Assume that the scene light remains unchanged, but that a different exposure value is now selected. In a manner described below, the variable attenuator 7 admits for example a greater amount of scene light onto the photoresistor 3. As a result, the potential at the first voltage-divider tap becomes positive relative to that at the second. As the amount of light incident upon photoresistor 3 increases, first the voltage applied across the light-emitting diode 11 will exceed the diode threshold voltage, and then the voltage applied across the resistor 10 will exceed the base-emitter threshold voltage of the transistor 8. Depending upon the resistance to which adjustable resistor 10 is set, the light-emitting diode 11 will light up as soon as the corresponding predetermined exposure-value error is exceeded.

If the exposure value is reselected in a sense causing less scene light to be incident upon photoresistor 3, then it is the diode 12 which lights up, with the transistor 9 becoming conductive.

The resistance of resistor 10 can advantageously be automatically set by mechanical means responsive to a marking, cam or other means 14 provided on a film cassette 15 and indicative of film sensitivity, or the like. In this way, depending upon the film sensitivity or the type of film employed, the resistance of adjustable resistor 10 will automatically be set to a value establishing the proper dead zone for the indicating arrangement — i.e., the range of exposure-value errors for which neither of the two light-emitting diodes should light up, for example because selection of the next-higher or next-lower exposure value would only increase the exposure-value error.

Figure 2:
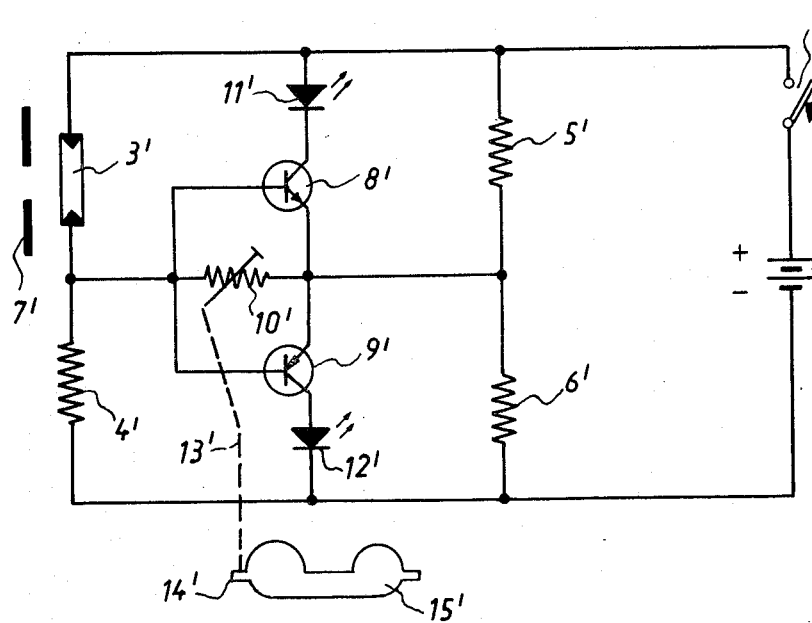
FIG. 2 depicts a second embodiment of the invention.

In the embodiment of FIG. 2, corresponding components are denoted by the same reference numerals as in FIG. 1, but with the addition of a prime. In FIG. 2, the light-emitting diodes 11', 12' are each connected between the collector of the associated transistor and the respective battery terminal.

In both FIGS. 1 and 2, the collectors of the transistors are connected to the respective battery terminals, their emitters are both connected to the second voltage-divider tap, and the two light-emitting diodes are each connected in the collector-emitter circuit of the respective transistor.

Figure 3:
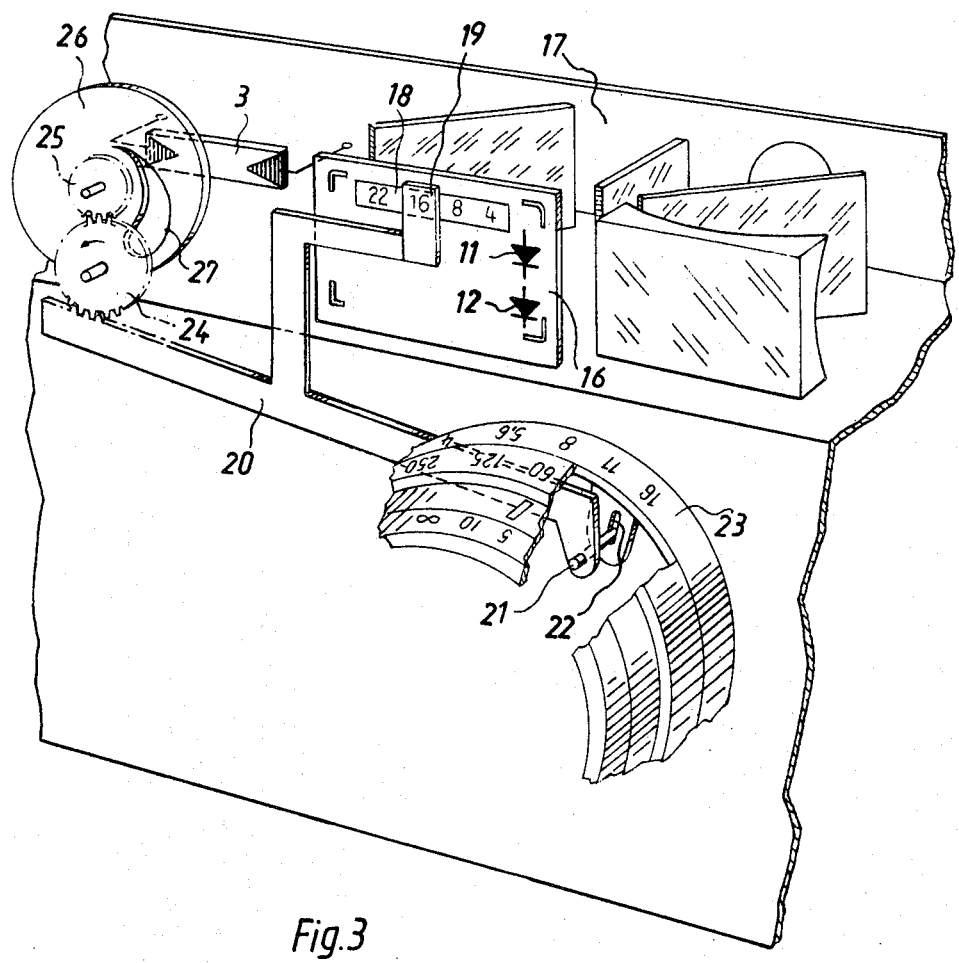
FIG. 3 depicts the interconnection between the light attenuator in FIGS. 1 and 2, on the one hand, and the exposure-value selector of a camera, on the other hand.

FIG. 3 depicts a photographic camera 17 in which the indicating arrangements of FIGS. 1 or 2 can be used. The two light-emitting diodes 11, 12 are located viewable through the camera viewfinder 16. A diaphragm-setting scale 18 is located viewable through the camera viewfinder. An indicating element 19, advantageously a colored but transparent element, is positioned over that number on scale 18 corresponding to the currently selected diaphragm setting. The indicating element 19 is mounted on a lever 20 which is connected by means of a pin-and-slot connection 21, 22 to the diaphragm setting selector 23 of the camera. At its other end, the lever 20 is configured as a rack 24 cooperating with a gear 25 to automatically change the setting of a variable light attenuator 26 (corresponding to 7 and 7' in FIGS. 1 and 2). Variable light attenuator 26 is provided with a trumpet-shaped opening 27 located in the path of scene light incident upon the photoresistor 3, and its setting is automatically varied in correspondence to the selected diaphragm setting.

It will be understood that each of the elements described above, or two or more together, may also find a useful application in other types of circuits and constructions, differing from the types described above.

While the invention has been illustrated and described as embodied in a circuit for indicating when the manually selected diaphragm setting is too high, too low or proper, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera provided with an exposure-value selector, in combination, first and second current source terminals for connection to a current source; a light-dependent first voltage divider connected across the current source terminals and comprised of at least one photosensitive means exposed to scene light and having a respective first voltage-divider tap; a light-independent second voltage divider connected across the current source terminals and comprised of light-independent resistor means and having a respective second voltage-divider tap; means for varying the light incident upon the photosensitive means in dependence upon the setting of the exposure-value selector; and an indicating arrangement for indicating when the selected exposure value is too high, too low or proper, comprising first and second transistors of complementary conductivity type having bases connected to each other and to the first voltage-divider tap, having emitters connected to each other and to the second voltage-divider tap and having collectors connected to respective ones of the current source terminals, first and second light-emitting diodes each connected in the collector-emitter circuit of a respective one of the transistors, and an adjustable resistor connected between the bases and emitters of the transistors operative for establishing the difference in potential between the two voltage-divider taps at which one or the other of the transistors becomes conductive.

2. In a camera as defined in claim 1, the first light-emitting diode being connected between the collector of the first transistor and the first current source terminal, the second light-emitting diode being connected between the collector of the second transistor and the second current source terminal.

3. In a camera as defined in claim 1, the anode of the first light-emitting diode and the cathode of the second light-emitting diode being connected directly to each other and to the emitters of the transistors.

4. In a camera as defined in claim 1, the exposure-value selector being a diaphragm-setting selector, the means for varying the light incident upon the photosensitive means comprising a light attenuator mounted in the path of light incident upon the photosensitive means and having a plurality of settings for differently attenuating the light incident upon the photosensitive means and means coupling the light attenuator to the diaphragm-setting selector.

* * * * *